(12) United States Patent
Oki et al.

(10) Patent No.: US 12,254,788 B2
(45) Date of Patent: *Mar. 18, 2025

(54) PRODUCT WITH INCORPORATED OPERATION DISPLAY PANEL

(71) Applicant: mui Lab, Inc., Kyoto (JP)

(72) Inventors: Kazunori Oki, Kyoto (JP); Nobuyasu Hirobe, Kyoto (JP); Fumiaki Shibayama, Kyoto (JP); Shinji Horii, Kyoto (JP); Takanori Yamamoto, Kyoto (JP); Makoto Nomura, Kyoto (JP)

(73) Assignee: MUI LAB, INC., Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/084,225

(22) Filed: Dec. 19, 2022

(65) Prior Publication Data

US 2023/0152914 A1 May 18, 2023

Related U.S. Application Data

(63) Continuation of application No. 16/471,005, filed as application No. PCT/JP2018/040206 on Oct. 29, 2018, now Pat. No. 11,656,699.

(30) Foreign Application Priority Data

Oct. 28, 2017 (WO) .................. PCT/JP2017/039017

(51) Int. Cl.
*G09F 23/00* (2006.01)
*F21V 8/00* (2006.01)
(Continued)

(52) U.S. Cl.
CPC ........... *G09F 23/00* (2013.01); *G02B 6/0068* (2013.01); *G02B 6/0088* (2013.01);
(Continued)

(58) Field of Classification Search
CPC .... G06F 3/0412; G06F 3/04162; G06F 3/041; G06F 3/044; G06F 3/1446; G02B 6/0068;
(Continued)

(56) References Cited

U.S. PATENT DOCUMENTS 9,257,104 B1 * 2/2016 Cherry ................... G10D 3/173
9,311,865 B1 * 4/2016 Chung ................. G02B 26/005
(Continued)

FOREIGN PATENT DOCUMENTS

CN      1132891 A    10/1996
CN      1384388 A    12/2002
(Continued)

OTHER PUBLICATIONS

International Search Report, PCT/JP2018/040206, Jan. 29, 2019, 4 pages.

*Primary Examiner* — Ryan A Lubit
(74) *Attorney, Agent, or Firm* — Ogilvie Law Firm

(57) ABSTRACT

The present invention provides a product with an operation display panel incorporated therein, which naturally harmonizes with the environment to not create visual noise for a user and allow the user to operate the operation display panel intuitively while feeling a natural material. A thin layer, made of a natural wood, natural fiber, natural leather, or natural stone, or a resin, synthetic fiber, synthetic leather or artificial stone created by imitating the appearance and touch of a natural material, is provided on the peripheral surface of a housing so that the thin layer covers at least the entire front surface of a display panel. A touch sensor incorporated comes in contact with the front surface of the panel. The thickness of the thin layer and the luminance of the panel are designed to allow the user to view the content displayed on the panel.

7 Claims, 15 Drawing Sheets

(51) Int. Cl.
*G06F 3/041* (2006.01)
*G09F 9/33* (2006.01)

(52) U.S. Cl.
CPC ......... *G02B 6/0091* (2013.01); *G06F 3/0412* (2013.01); *G06F 3/04162* (2019.05); *G09F 9/33* (2013.01); *G06F 2203/04107* (2013.01)

(58) Field of Classification Search
CPC ....... G02B 6/0088; G02B 6/0091; G09F 9/00; G09F 9/30; G09F 9/33
See application file for complete search history.

(56) References Cited

U.S. PATENT DOCUMENTS

| | | | |
|---|---|---|---|
| 2002/0031620 A1 | 3/2002 | Yuzawa et al. | |
| 2008/0055270 A1* | 3/2008 | Cho | G06F 3/045 345/173 |
| 2008/0055931 A1* | 3/2008 | Verstraete | G02B 6/0096 362/617 |
| 2014/0353691 A1* | 12/2014 | Lee | H10K 59/40 257/88 |
| 2017/0146721 A1 | 5/2017 | Fukui et al. | |
| 2017/0183820 A1* | 6/2017 | Banzashi | B32B 5/28 |
| 2017/0194364 A1* | 7/2017 | Zhai | G02F 1/133305 |
| 2017/0236866 A1* | 8/2017 | Lee | H05B 47/19 257/89 |
| 2017/0371087 A1* | 12/2017 | You | G02B 6/00 |
| 2018/0031751 A1* | 2/2018 | Sugiyama | G02B 6/009 |
| 2018/0031759 A1* | 2/2018 | Kong | G02B 6/0068 |
| 2018/0150155 A1* | 5/2018 | Nishikawa | G06F 3/0445 |
| 2019/0018528 A1* | 1/2019 | Higano | G02F 1/1345 |
| 2019/0026056 A1* | 1/2019 | Wang | G06F 1/1637 |
| 2019/0063722 A1* | 2/2019 | Sugiyama | B32B 7/12 |
| 2019/0069403 A1* | 2/2019 | Heikkinen | G02B 6/0011 |
| 2020/0214148 A1* | 7/2020 | Teil | H03K 17/962 |
| 2020/0262744 A1* | 8/2020 | Fenton | C03C 3/078 |

FOREIGN PATENT DOCUMENTS

| | | |
|---|---|---|
| CN | 105976711 A | 9/2016 |
| JP | 2571743 Y2 | 5/1998 |
| JP | 2009-096380 A | 5/2009 |
| JP | 2015-118398 A | 6/2015 |
| JP | 2016-081817 A | 5/2016 |
| WO | 2017/154904 A1 | 9/2017 |

* cited by examiner (1)

(2)

(1)

(2)

PRODUCT WITH INCORPORATED OPERATION DISPLAY PANEL

RELATED APPLICATIONS

The present application incorporates by reference the entirety of, and claims priority to, U.S. patent application Ser. No. 16/471,005 filed 19 Jun. 2019, PCT application PCT/JP2018/040206 filed 29 Oct. 2018, and PCT application PCT/JP2017/039017 filed 28 Oct. 2017.

TECHNICAL FIELD

The present invention relates to an operation display device mounted on a controller of a home appliance, a display of an electronic device, or a movable body such as an automobile.

BACKGROUND ART

In recent years, information communication technology has undergone remarkable progress. In the past, personal computers were used only in limited spaces such as homes and offices, but with the spread of smartphones and tablet terminals, today, it has become possible for anyone to live a highly convenient life using the Internet and so on. Also, from the viewpoint of the Internet of Things (IoT), new products using the Internet are being developed one after another for home appliances and the like that had not been conventionally connected to the Internet. Thus, the Internet and products using the Internet have already become indispensable to people's lives, and they are installed or carried everywhere and used by many people.

However, while people can enjoy a very convenient life by having all kinds of electronic devices existing around them, there are many people who feel stressed about living surrounded by electronic devices.

For example, a hotel that treasures the warmth of natural trees can be said to be providing a high-quality space where guests can relax and forget their work etc. However, if there are a large number of electronic devices, displays or controllers having inorganic forms in such guest rooms, it will not be possible for guests to forget daily life and relax sufficiently.

Conventionally, as a product utilizing natural wood, there is known a digital watch wherein time emerges in the grain. This is obtained by laminating a thin plate on the surface of a digital watch, which provides a feel of a texture in which the warmth of wood is felt (see Non-Patent Document 1).

However, since a clock is only a clock after all and the time is always displayed even when it is not necessary to check the time as long as the power is in the on-state, this unavoidably becomes a visual noise for the user. In addition, a display device here is only a display device, and it is impossible for the user to operate any such device while feeling the warmth of natural wood by touching the surface of the wood.

Display devices and electronic apparatus furnished with the display devices that secure external visibility and improved designability are known. (Refer to, for example, Patent Document 1). The designability of the display device here under off-state is improved by hiding the LED inside the device and thus making it difficult to see the LED from the outside of the device by arranging an opaque layer or a half mirror layer between the translucent member and the light emitter.

Namely, the display device and the electronic device disclosed in Patent Document 1 is not furnished with a member for enhancing the designability on the surface of the article in consideration of the harmony with the space, etc. but for hiding the LED that is the light emitting element to improve the designability.

In addition, as an example wherein a display function is installed on an article that does not function as a luminous body, a rearview mirror in which light such as an LED is displayed on a mirror surface of a rearview mirror of a car is known. (Refer to, for example, Patent document 2). This consists of a radiated light emission display device for generating radiated light through a mirror plated disposed at the rear of the mirror plate of the rearview mirror. Accordingly, it can be said at least that this structure does not make one aware of its existence when the radiated light emission display does not emit light.

However, the rearview mirror disclosed in Patent Document 2 merely improves the convenience during driving, not being something that relaxes the user by using a material derived from nature and the like.

Further, a wooden decorative article wherein a veneer is disposed on the front side and a synthetic resin is disposed on the back side is known. (Refer to Patent Document 3)

This is a decorative item made of an integrated piece of sliced wood veneer and a synthetic resin, which can be said to give the warmth of wood. Further, a configuration wherein LED elements and such are disposed at the rear surface side of the substrate is also disclosed.

However, it is known that the wooden decorative article disclosed in Patent Document 3 can perform predetermined displays utilizing the LED but does not provide the user with certain operability of an apparatus by intuitively touching.

Furthermore, as an apparatus considering the harmony and such with a space, an apparatus for displaying contents for viewers in the viewer space is known (see Patent Document 4). This performs content display on the display from different directions.

However, even the apparatus disclosed in Patent Document 4 does not provide user the ability to operate any device by just touching.

Moreover, an interface for interior parts in a motor vehicle including a fascia formed from a veneer of wood is known (Refer to Patent Document 5). This includes a layer formed by a polycarbonate film on a veneer, which enables display and operate without impairing the texture of the wood.

However, in the interface disclosed in Patent Document 5, the part that receives the operation input is a switch located on the rearmost panel in the same manner as the light emitting element, which does not enable intuitive operation such as scrolling.

Further, an article furnished with a display structure whose presence does not cause consciousness of its own presence in its non-displayed status is known. (See, for example, Patent Document 6)

This article has a light emitting display element between a front case member having a translucent opaque coating film formed on the front side of a transparent substrate and a light emitting display element disposed on the back side of the front case member. A dark-colored member has a light guide hole formed corresponding to the light-emitting portion of the above structure, which ensures visibility in the display state, but does not make one conscious of the display structure in the non-display state.

However, the article provided with the display structure disclosed in Patent Document 6 does not use a natural material such as wood as an opaque coating film having translucency, and thus it is difficult to bring about the relaxing effect for the user in a non-display state.

PRIOR ART

Patent Literature

[Patent literature 1] JPA2004-354478
[Patent literature 2] JPA2000-238579
[Patent literature 3] U.S. Pat. No. 7,097,913
[Patent literature 4] U.S. Pat. No. 9,013,515
[Patent literature 5] US2009-0058118
[Patent literature 6] JPA2007-206577

Non-Patent Literature

[Non-patent literature 1] STYLE STORE's homepage, "Mysterious clock with time in the woody texture" (http://stylestore.jp/item/BF026-00-0010-0035/)

OUTLINE OF THE INVENTION

Problems to be Solved by the Invention

In view of such a situation, it is an object of the present invention to provide an article having an operation display panel being incorporated therein, and not becoming visual noise for the user, by harmonizing naturally with a space, and when the user wants to use it or when the need to operate it arises, the panel is intuitively operable while also feeling to the touch like natural materials.

Means to Solve the Objects

In order to solve the problems mentioned above, the operation display panel-incorporated article of the present invention is configured with a design wherewith the thickness of a thin layer and the panel brightness are designed so that contents displayed on the panel concerned can be visually recognized, with the thin layer being made of a wood derived from nature, a natural fiber, a natural leather or a natural stone, or a resin, synthetic fiber, synthetic leather or artificial stone produced to mimic natural appearance, the thin layer being arranged on a circumference surface of the housing so that the thin layer at least covers the whole display panel, with a touch sensor integrated at the circumference surface of the housing.

A natural touch feeling can be realized by using a naturally-derived material or a material generated by imitating an appearance and touch of nature. Therefore, a polymer material such as a resin can also be used as the material of the thin layer as long as it realizes a natural appearance and has a natural touch feeling. Since the resin is easy to mold, there is an advantage in that a thin layer having a three-dimensionally complicated shape can be produced. Here, the polymer material refers to a material having a large molecular weight, and refers to a polymer obtained by polymerizing a monomer, or a compound having a large molecular weight such as a natural polymer. Moreover, when using resin in an electrostatic capacitance type touch panel, it is preferable that an insulating resin with high dielectric constant is used. In addition, the display panel furnished with a touch sensor allows the user to directly touch a naturally-derived material and the like to operate intuitively. Here, a touch sensor is attached to substantially the entire surface of a panel, and can realize a function in which the user can intuitively perform an operation such as tapping or scrolling by touching directly with a finger. Some embodiments include a transparent conductive film having a touch panel.

In an operation display panel-incorporated article of the present invention, the thin layer preferably has a light transmittance in the range of 1 to 50%, more preferably 5 to 20%, still more preferably 8 to 15%, and further more preferably, it is 9 to 11%. Here, the light transmittance refers to the visible light transmittance, and indicates the value of the transmittance (%) of light having a wavelength of 380 to 780 nm.

Also, the thin layer is a veneer or plywood made of wood, or a substrate obtained by molding wood chips, and preferably has a thickness in the range of 0.1 to 0.5 mm.

By setting this kind of range, it becomes possible to prevent the rear member from being seen in non-display time while securing visibility at the time of display.

In an operation display panel-incorporated article of the present invention, in the case of wood, it is possible to select from sycamore wood, maple wood, cherry wood or walnut wood, but it is not limited to this selection. When selecting wood, it is preferable to select from the viewpoint of thinness of grain, fineness of grain, fineness of conduit and easy availability.

In an article incorporating an operation display panel of the present invention, the thin layer may be a woven or non-woven substrate composed of natural fibers.

By using a base material made of woven fabric or nonwoven fabric comprised of a natural fiber, the article can be made to be excellent in texture and provide a beautiful interior. Also, synthetic fibers that mimic the natural appearance and feel can be used. Here, in the woven fabric composed of natural fibers or synthetic fibers, it is possible to control the translucency of the thin layer by selecting the roughness of the weave and the thickness of the fibers.

In an article incorporating an operation display panel described in the present invention, a transparent protective layer is preferably provided on the front surface of the thin layer. Since the operation display panel-incorporated in an article is directly touched by the user in its use, scratches and dirt may be inflicted. Infliction of scratches and dirt can be prevented by providing a transparent protective layer on the front surface of the thin layer. Here, as a material of the transparent protective layer, a urethane based paint, a polyester based paint, a phenol resin based paint, an acrylic resin based paint or the like can be used.

In an article incorporating an operation display panel described in the present invention, a transparent reinforcing layer may be provided on the back surface of the thin layer. By providing the transparent reinforcing layer on the back surface of the thin layer, the strength of the thin layer can be improved. As a material of a transparent reinforcement layer, polyvinyl chloride films and polyolefin films such as polyethylene and polypropylene, for example, can be used.

In an article incorporating an operation display panel described in the present invention, the panel is preferably furnished with, at least, a transparent base material, a transparent conductive sheet, a light emitting element array having light emitting element which is 2-dimensionally arrayed, and a light guide for guiding the light emitting direction of the light emitting element. By disposing a light guide, the visibility of the display can be improved. Here, as the transparent base material, poly-carbonate resin, poly-ethylene terephthalate, acrylic resin, poly-acetal resin, poly-sulfonic resin, poly-phenylene sulfide resin and so on can be used.

In an operation display panel-incorporated article of the present invention, the light guide is an opaque dark color base material laminated on the substrate of the light emitting element array enclosing the entire light emitting element array, and preferably through holes are disposed along the optical axis of each light emitting element. By providing the through holes along the optical axis of each light emitting element, the visibility at the time of light emission can be improved. As a dark color base material substrate, a black base material is suitably used.

In an operation display panel-incorporated article of the present invention, it is preferable that the diameter of the through hole of the light guide is equal to or larger than the diameter of the light emitting area of the light emitting element, and the aspect ratio is in the range of 0.5 to 3.0. By setting the range as described here, the visibility at the time of light emission can be improved.

In an operation display panel-incorporated article of the present invention, the panel is composed of a transparent substrate, a transparent conductive sheet, a light guide and a light emitting element array which are sequentially laminated, the transparent substrate and the transparent conductive sheet are in close contact and a gap is preferably provided between the transparent conductive sheet and the light guide. This is due to the fact that, when the transparent conductive sheet and the light guide are in close contact with each other, the stress applied to the transparent conductive sheet may vary when the operation display panel is operated, which may cause a malfunction.

In an operation display panel-incorporated article of the present invention, in the panel, a transparent conductive sheet, a transparent base, a light guide, and a light emitting element array are sequentially laminated, and the transparent conductive sheet and the transparent base may be in close contact with each other. When the transparent conductive sheet, the transparent base, the light guide, and the light emitting element array are sequentially laminated, stress unevenness on the transparent conductive sheet generated by adherence of the transparent conductive sheet and the light guide, as mentioned before, does not occur.

In an operation display panel-incorporated article of the present invention, it is preferable that light emitting elements of the light emitting element array and the through holes of the light guide have the same pattern and they both are arranged at the same pitch, and the pitch interval is 5 mm or less. By making the arrangement pattern and the pitch of the light emitting elements of the light emitting array and through holes of the light guide the same, visibility is improved effectively for all the light emitting elements by the light guides.

An operation display panel-incorporated article of the present invention and all the constituents thereof, such as the transparent substrate, the transparent conductive sheet, the light guide, and the substrate of the light emitting element array, may be flexible. Thereby, an operation display panel-incorporated article of various shapes can be produced. Note that the thin layer can be said to be naturally flexible with respect to thin wood plates, fibers, and leather.

In an operation display panel-incorporated article of the present invention, the whole or a part of the outer peripheral surface of the casing may have a curved shape, and the panel may be incorporated in such a way as to abut on the curved surface. Here, the curved surface shape broadly includes a curved shape, a bent shape, and the like, and further includes a plurality of different curved shapes, and a shape in which a bent shape is formed in a complicated manner. In addition, a plurality of operation display panel-incorporated articles may be incorporated along a curved surface shape.

In an operation display panel-incorporated article of the present invention, a panel control unit that controls the panel determines data from the touch sensor and drives the light emitting element array according to the display content of the display panel based on the determination result, or data from the touch sensor is determined, and the light emitting element array is driven according to the display content of the display panel based on the determination result. At the same time, data is transmitted to the outside through wired communication or wireless communication, or alternatively, data from the outside is received via wireless communication, and the light emitting element array is driven according to the display content of the display panel based on the determination result of the received data. With such a configuration, it becomes possible not only that the light emitting element array be driven according to the user's operation, but also that the external device be operated or data be received from the outside without the user's operation.

An operation display panel-incorporated article of the present invention further includes a speaker, and a panel control unit controlling the panel determines data from the touch sensor and outputs a sound signal to the speaker based on the determination result. Or alternatively, external data may be received via wired or wireless communication, and a sound signal may be output to the speaker based on the determination result of the received data. By furnishing the speaker, the user's convenience can be improved; for example, the user's attention is prompted by sound, or the user can feel the touch operation by feeling the sound.

An operation display panel-incorporated article of the present invention further furnishes a microphone, and the panel control unit for controlling the panel discriminates sound data received from the microphone, and drives a light emitting element array, according display content to the display panel based on the discrimination result, or sound data from the microphone is discriminated and the light emitting element array is driven according display content to the display panel based on the discrimination result, and data may be transmitted to the outside through wired or wireless communication. By furnishing the microphone, voice input operation is enabled, and the convenience of the user is improved.

An operation display panel-incorporated article of the present invention is configured with a thin layer composed of a wood derived from nature, a natural fiber, a natural leather or a natural stone, or a resin which is a material produced to mimic a natural appearance and touch, synthetic fiber, a thin layer made of synthetic leather or artificial stone, and a display panel with a touch sensor, a panel control unit that controls the panel, and a housing. The thin layer has a light transmittance in the range of 1 to 50% and is disposed at an outer peripheral surface of the housing in such a way that the thin layer at least covers the whole area of the panel front surface, is incorporated to the outer surface of the housing, and abuts to the panel front surface. The panel is configured with a transparent base material, a transparent conductive sheet, a light emitting element array with dimensionally arranged light emitting devices and a light guide for guiding the light emitting direction of the light emitting element, each being laminated, having a brightness allowing one to visually recognize the displayed contents.

An operation display panel-incorporated article of the present invention is configured with a thin layer composed of a wood derived from nature, a natural fiber, a natural leather or a natural stone, or a resin which is a material produced to mimic a natural appearance and touch, synthetic fiber, a thin layer made of synthetic leather or artificial stone, and a display panel with a touch sensor, a panel control unit that controls the panel, and a housing. The thin layer has a light transmittance in the range of 1 to 50% and is disposed at an outer peripheral surface of the housing in such a way that the thin layer at least covers the whole area of the panel front surface, is incorporated to the outer surface of the housing, and abuts to the panel front surface, and possesses a thickness that allows one to visually recognize the contents displayed on the panel.

In an operation display panel-incorporated article of the present invention, the panel may also constitute all or a part of a component aiming at objectives of the movable body, for displaying for the user and/or for operation by the user.

Movable bodies are often used for people to move or carry things, and the interiors often have a cold inorganic flavor. Therefore, by using the panel for display and also for operation in the movable body, it is possible to obtain a configuration that provides a natural appearance and touch. In the movable body, since the durability is required to be high from the viewpoint of safety, a resin is preferable as the thin layer.

Note that the movable body here means not only vehicles such as cars and railroad cars but also all movable objects such as airplanes, helicopters and ships. In addition, the movable body is not limited to one on which a person can ride, and may be one operated by a person from outside such as a drone, for example.

In addition, the user is not limited to a crew who performs an operation such as driving or a passenger who does not perform a driving operation, but a person who visually recognizes what is displayed in or on the movable body or touches and operates the movable body is also widely included. Thus, for example, in the case of an airplane, not only crew members such as pilots or passengers but also maintenance personnel and others not limited to direct users of travel are included. In addition, in the case of a drone, not only the drone pilot but also those who visually recognize what is displayed at the drone exterior or touch the drone to operate it are widely included.

In an operation display panel-incorporated article of the present invention, the panel may constitute the whole or a part of an instrument panel in a vehicle. In general, in vehicles such as automobiles, interiors are often of inorganic things. Therefore, to form the instrument panel in the vehicle, the panel can be made an instrument panel that provides a natural appearance and touch. In a vehicle, since durability is required to be high from the viewpoint of safety, a resin produced by imitating the natural appearance and touch is preferable, as the thin layer.

In an operation display panel-incorporated article of the present invention, the panel may constitute all or part of at least one of a door trim and an armrest for a vehicle. By making a door trim or an armrest for a vehicle with the panel, the panel can provide a natural appearance and touch, and the door or armrest can be highly convenient.

Here, the door trim is a lining component on the door interior side. Further, the armrest may include not only an armrest provided at the center of the front seat or rear seat but also a door armrest. Also, the door arm rest includes not only a portion used for the armrest but also a portion where the power window switch is provided. Further, in a vehicle, since durability is required to be high from the viewpoint of safety, a resin produced by imitating natural appearance and touch is preferable as the thin layer.

Effects of the Invention

According to the operation display panel-incorporated article of the present invention, there is an effect that the article here does not become a visual noise for the user, by harmonizing naturally with the space, and when the user wants to use it or needs it, it is possible to operate intuitively while feeling the touch, and it is possible to realize a high quality indoor living space and a natural outdoor space.

BEST MODE FOR CARRYING OUT THE INVENTION

Embodiments of the present invention will be described in detail below with reference to the drawings. The present invention is not limited to the following embodiments and examples shown in the figures, and the present invention can be variously changed in design.

Embodiment 1

Figure 1:
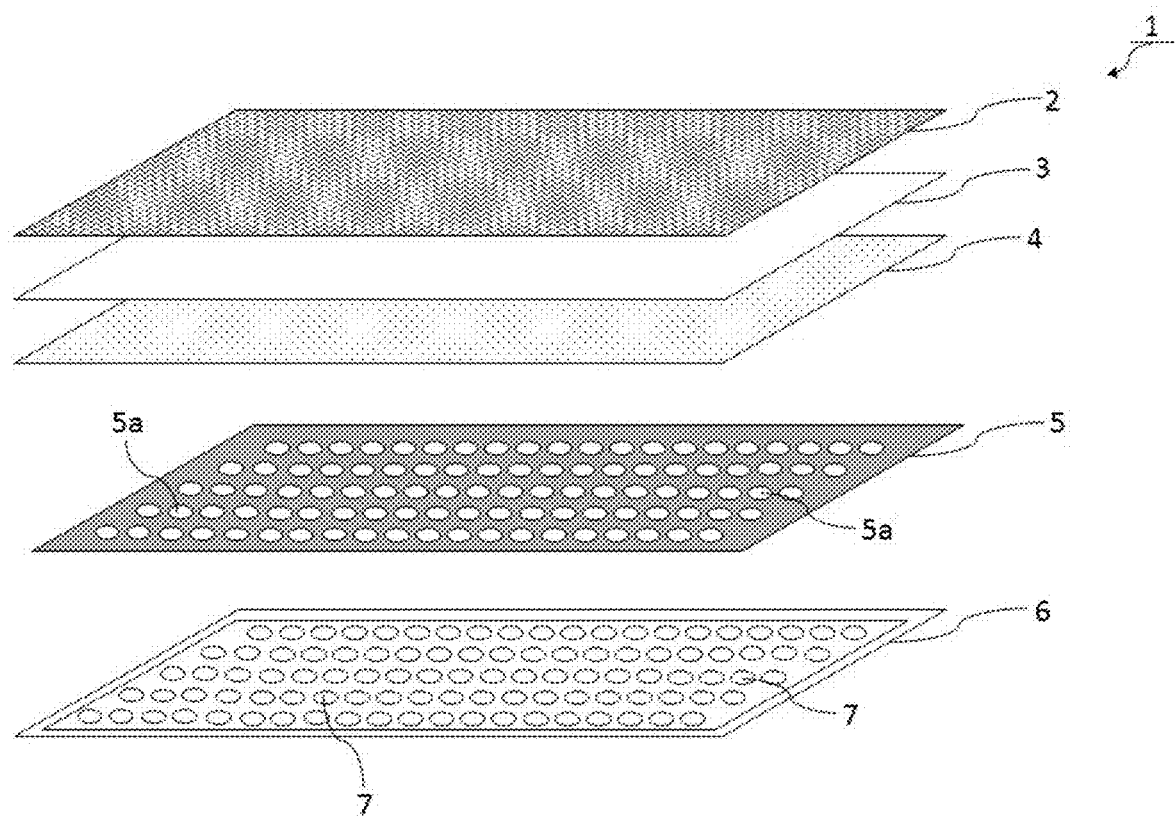
FIG. 1 shows a configuration image of an operation display panel-incorporated article of an Embodiment 1.

FIG. 1 shows a configuration image of an operation display panel-incorporated article of Embodiment 1. As shown in FIG. 1, the operation display panel-incorporated article 1 is composed of a plate 2, a transparent base 3, a touch panel sheet 4 as a transparent conductive film, a light guide 5 and an LED array 6 as a light emitting element array. It is sequentially laminated. The plate 2 is located on the outer surface of the operation display panel-incorporated article, and the LED array 6 is configured to be located inside the article. A large number of LED light sources 7 are two-dimensionally arranged in the LED array 6. The light guide 5 guides the light emission direction of each LED light source 7 in the direction perpendicular to the substrate of the LED array 6. Guide holes 5a, in the same number as the number of LED light sources 7, are provided.

In FIG. 1, for convenience of explanation, although not all LED light sources are shown, the LED array 6 is configured of, for example, a total of 6400 LED light sources with 32 vertical by 200 horizontal. One LED light source is composed of planar mounting type LEDs. A point light source is realized by the light of one LED light source, and this can be regarded as one dot, and one character or pattern can be represented by 8×8 dots or 16×16 dots. For example, in the case of the LED array 6 having 6400 LED light sources, a 22-character by 3-line sentence can be expressed. Here, as the LED light source, for example, one with a size of 2 mm×2 mm and 700 to 1000 mcd (Millicandela) is used.

The light guide 5 plays a role of making a character or a pattern formed of light emitted from the LED light source 7 clearly visible through the plate 2. Namely, when the light guides 5 are stacked on the LED array 6, a large number of guide holes 5a are arranged in accordance with the arrangement of the LED light sources 7 so that the guide holes 5a are arranged immediately above each respective LED light source 7.

(Selection of Wood Veneer)

A Sycamore material is used for the wood veneer 2. In selecting a veneer, a comparative experiment was conducted using a plurality of woods, and a qualitative evaluation was performed. The species of wood to be subjected to comparative experiments was selected on the basis of thinness of grain, fineness of grain, fineness of conduit and easiness of availability. Those with a thin grain are those with unclear winter grain. In addition, the reason for using thin conduits as the selection item is that when the conduits are thick, the conduits appear like fissures, which appears to direct light from light source leaks, resulting in a reduction of visibility.

As a result of selecting wood species for comparative experiments based on the selection criteria described above, sycamore, quercus, oak, zebra wood, cherry, mahogany, maple and walnut were selected. These woods were irradiated with LED light with a luminous intensity of 700 mcd to evaluate the transmittance. Table 1 below qualitatively shows the results of comparative experiments with the wood veneer. In the table, "⊚" indicates "very good", "○" indicates "good", "Δ" indicates "somewhat bad", and "x" indicates "bad".

As shown in Table 1 above, firstly, with regard to Sycamore, it was evaluated as "very good" because the light transmittance was as high as about 10% and the appearance was good. The cherry, maple and walnut were evaluated as "good" because they had high light transmittance but were slightly inferior in appearance to Sycamore. In addition, for walnut and oak, the light leakage from the conduit was evaluated as "slightly bad" because the light leakage was somewhat severe. The zebra wood was evaluated as "poor" because the wood grain is dark and light is not transmitted. Mahogany was rated "bad" because the light leakage from the conduit was severe.

From the above, it was found that, among the tree species for which the comparative experiment was performed, the Sycamore wood is suitable as a veneer of the present article.

Figure 2:
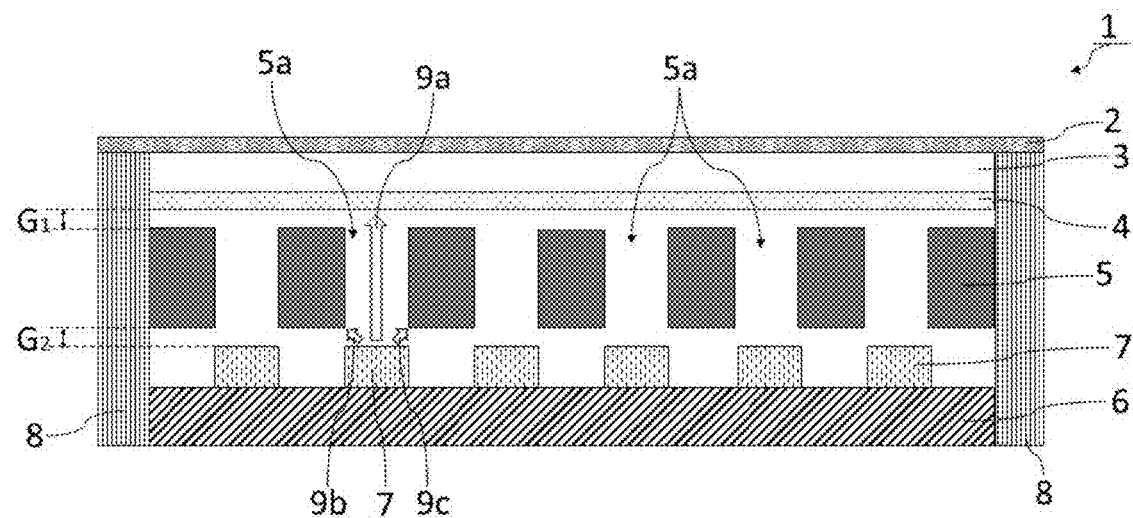
FIG. 2 shows a schematic cross-sectional view of the operation display panel-incorporated article of the first embodiment.

Next, the structure after assembly of the operation display panel-incorporated article after assembly is described by referring to FIG. 2.

FIG. 2 shows a schematic cross-sectional view of the operation display panel-incorporated article of the first embodiment. As shown in FIG. 2, in the operation display panel-incorporated article 1, the plate 2, the transparent base 3, the touch panel sheet 4, the light guide 5 and the LED array 6 are stacked in order from the top and adhered to the housing 8. Out of the light emitted from the LED light source 7 disposed on the LED array 6, the obliquely emitted light (9b, 9c) is blocked by the light guide 5, and the emitted light reaches the wood veneer 2 as a straight light like 9a. Note that the housing 8 is mainly made of ABS resin.

The wood veneer 2 and the transparent substrate 3, or the transparent substrate 3 and the touch panel sheet 4 are bonded without providing a gap. On the other hand, a gap $G_1$ is provided between the touch panel sheet 4 and the light guide 5. This is because the light guide 5 is provided with the guide holes 5a, and when the touch panel sheet 4 and the light guide 5 are bonded, a stress variation occurs when operating the touch panel, which becomes a cause of a malfunction.

Also, a gap $G_2$ is provided between the light guide 5 and the LED light source 7. Since the number of LED light sources 7 provided in the LED array 6 and the number of guide holes 5a provided in the light guides 5 are several thousands, when the light guides 5 and the LED arrays 6 are stacked, there is a possibility that an arrangement error occurs. When the light guide 5 and the LED array 6 are bonded in a state where an error occurs, the light emitted from the LED light source 7 does not pass through the guide hole 5a and an accurate display cannot be performed. Therefore, by providing the gap $G_2$, it is possible to prevent deterioration of display quality caused by an error in the arrangement of the LED light source 7 and the guide hole 5a. In addition, since the display quality can be maintained even if there are some errors, the manufacture becomes easy.

Figure 3:
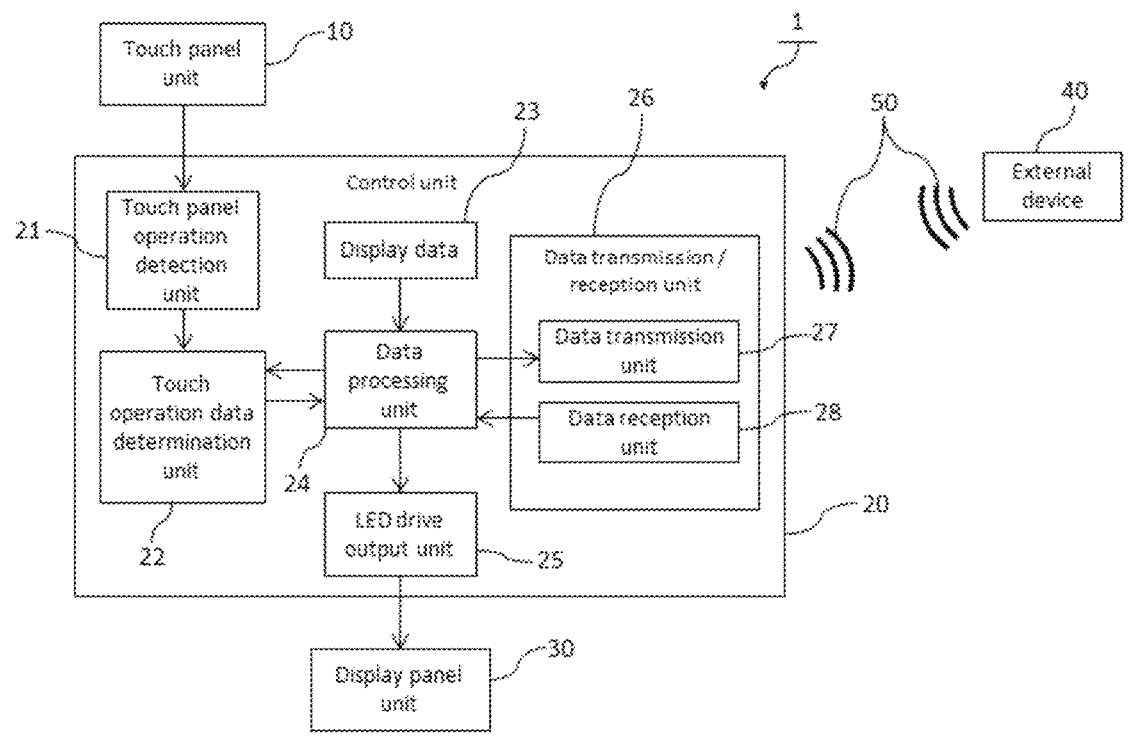
FIG. 3 shows a functional block diagram of the operation display panel-incorporated article of Embodiment 1.

Next, the relationship between an operation and the display of the operation display panel-incorporated article will be described. FIG. 3 shows a functional block diagram of the operation display panel-incorporated article of the Embodiment 1. As shown in FIG. 3, the operation display panel-incorporated article 1 includes a touch panel unit 10, a control unit 20 and a display panel unit 30. Further, the control unit 20 is provided with a touch panel operation detection unit 21, a touch operation data determination unit 22, display data 23, a data processing unit 24, an LED drive output unit 25, and a data transmission/reception unit 26.

TABLE 1

| | Sycamore | Quercus | Oak | Zebra wood | Cherry | Mahogany | Maple | Walnut |
|---|---|---|---|---|---|---|---|---|
| Evaluation | ⊚ | Δ | Δ | X | ○ | X | ○ | ○ |

The data transmission/reception unit 26 includes a data transmission unit 27 and a data reception unit 28.

When a user (not shown) performs an input operation on the touch panel unit 10, the touch panel operation detection unit 21 disposed in the control unit 20 detects which position on the touch panel the user has touched. The data processing unit 24 receives the display data 23 and sends the data to the touch operation data determination unit 22. The touch operation data determination unit 22 determines what operation the user has performed based on the data obtained by the touch panel operation detection unit 21 and the display data 23, and the touch operation data obtained by the determination is sent to the data processing unit 24.

The data processing unit 24 determines which LED is to be lighted in what way on the basis of the touch operation data determined by the touch operation data determination unit 22, and transmits the determined data to the LED drive output unit 25 for display on the display panel unit 30.

Further, the touch operation data sent to the data processing unit 24 is sent from the data sending unit 27 to an external device 40 via the means of communication 50. Thereby, the user can control the external device 40 by operating the touch panel unit 10. Also, it is possible that the data receiving unit 28 receives data from the external device 40 via the communication means 50, sends said data to the data processing unit 24, and the data processing unit 24 determines which LED is to be lighted in what way, and the determined data is transmitted to the LED data drive output unit 25 and displayed on the display panel unit 30.

In the present embodiment, the communication means 50 performs wireless communication. However, the present invention is not limited to this, and wired communication may be performed. Moreover, as an example of the external device 40, not only household appliances such as an air conditioner and a lighting fixture, but also a portable information terminal such as a smartphone and a personal computer can be mentioned.

Unlike the present embodiment, the operation display panel-incorporated article 1 and the external device 40 might not directly communicate with each other, but could communicate with each other via an external server by wired or wireless communication.

Figure 14:
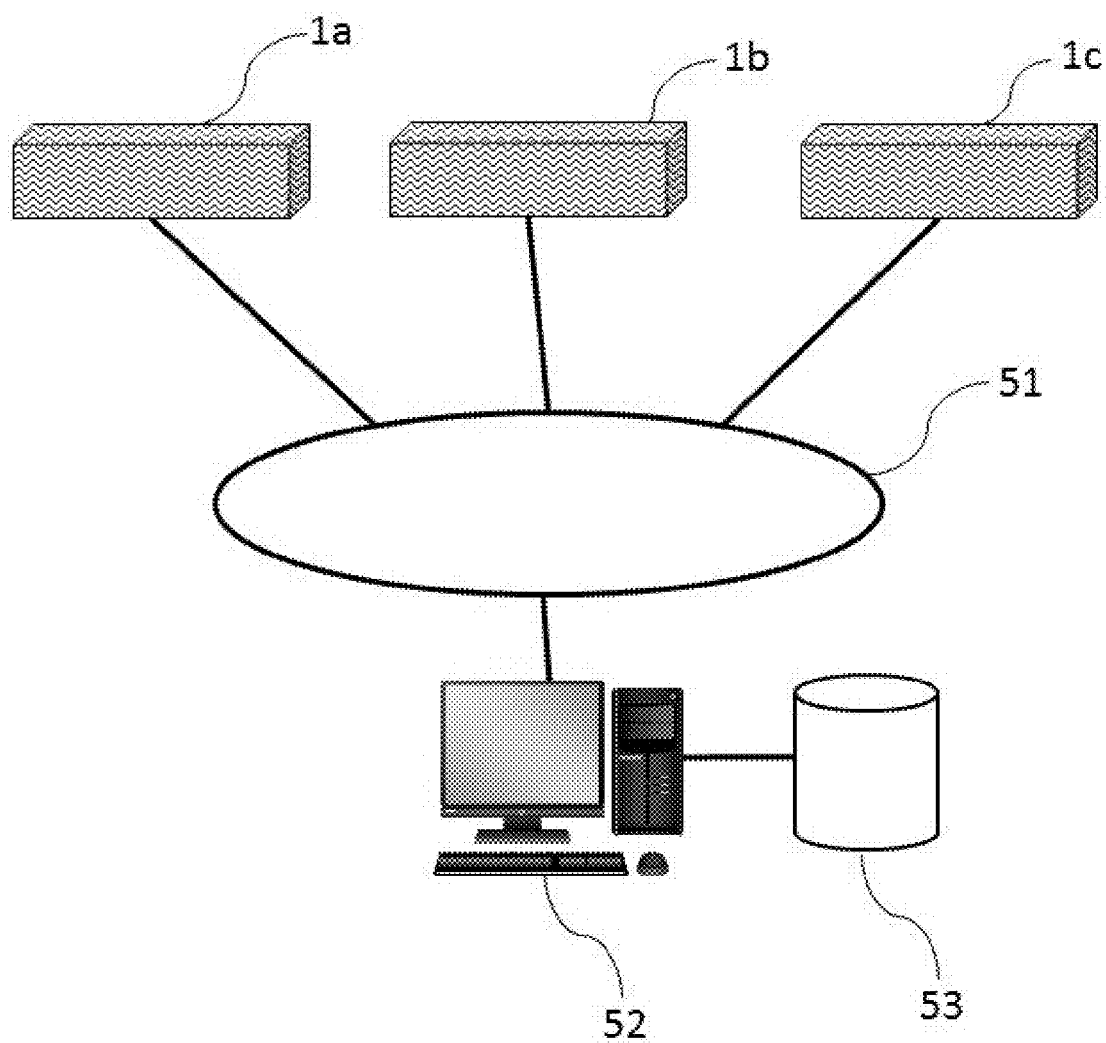
FIG. 14 shows a network configuration diagram using the operation display panel-incorporated article of the first embodiment.

Such a configuration is described with reference to FIG. 14. FIG. 14 shows a network configuration diagram using the operation display panel-incorporated article of the first embodiment. As shown in FIG. 14, the operation display panel-incorporated articles (1a to 1c) can communicate with the computer 52 via the Internet 51, respectively, and the computer 52 is connected to the server 53 in a wired or wireless manner. Therefore, for example, position information of the operation display panel-incorporated article (1a to 1c) is registered in the server 53 in advance, and daily weather forecasting is performed from the computer 52 via the Internet 51 based on the information concerned. It is possible to transmit communications to the incorporated articles (1a to 1c) and display them on the display panel unit 30 of the operation display panel-incorporated article (1a to 1c).

Note that the server 53 may be connected to the computer 52 via the Internet 51.

The LED display in the display panel unit 30 may be configured to be constantly displaying, or may be configured to be switched on/off in response to some event.

As an example of an event for starting display, occasions such as touch input by a user, a human body sensor that detects approach of someone, a sensor disposed at a room door, automatic display at every constant time or at a predetermined time, are considered. Furthermore, as an example of a displaying end event, it is conceivable that a certain time has elapsed for the display, that the operation is automatically terminated at a specific time, or that the presence of a person is no longer recognized by the human sensor.

The power source used for the operation display panel-incorporated article 1 may be either a battery or an external power source.

Embodiment 2

Figure 4:
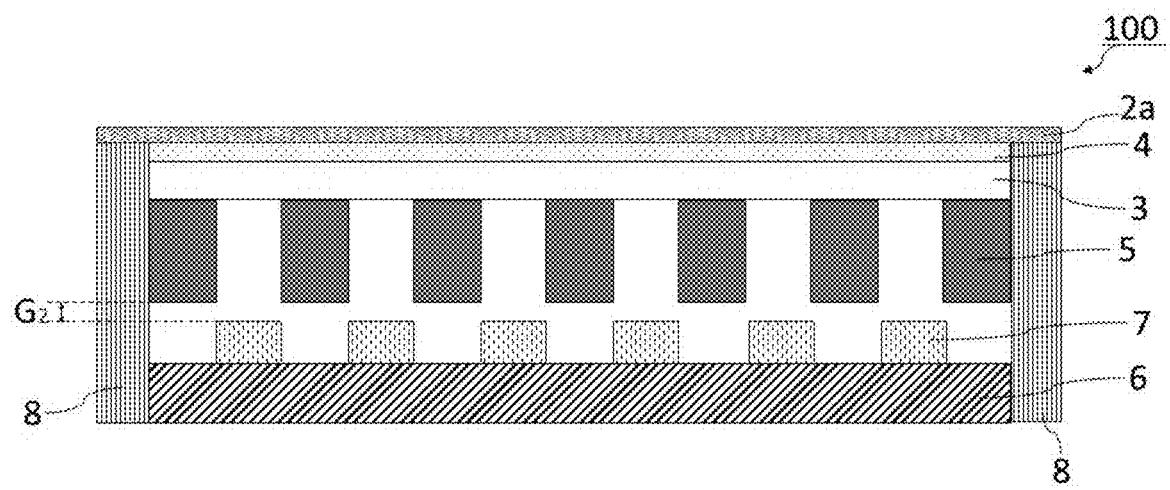
FIG. 4 shows a schematic cross-sectional view of the operation display panel-incorporated article of an Embodiment 2.

FIG. 4 shows a schematic cross-sectional view of the operation display panel-incorporated article of Embodiment 2.

As shown in FIG. 4, in the operation display panel-incorporated article 100, unlike Embodiment 1, the veneer (or plate) 2a, the touch panel sheet 4 and the transparent base material 3 are stacked in order from the top. The touch panel sheet 4 needs to be adhered to a base having a small number of uneven surfaces in order to maintain the accuracy at the time of touch panel operation. The transparent substrate 3 is bonded to the touch panel sheet 4 as in Embodiment 1 because there are few irregularities on the surface, and is bonded in the present Embodiment as well. By contrast, in Embodiment 1, the plate 2 and the touch panel sheet 4 are not in direct contact with each other, structurally. However, in the present embodiment, it is possible to bond to the touch panel sheet 4 because the plate 2a is made of wood with very few irregularities on the surface.

In Embodiment 1, as shown in FIG. 2, since the plate 2, the transparent base material 3, and the touch panel sheet 4 are stacked in order from the top, it was necessary to set a gap $G_1$ between the touch panel sheet 4 and the light guide 5 to be stacked thereunder. However, in Embodiment 2 as shown in FIG. 4, the wood veneer 2a, the touch panel sheet 4 and the transparent substrate 3 are stacked in this order from the top, and it is unnecessary to provide a gap between the touch panel sheet and a light guide 5 to be stacked thereunder, in the configuration here.

Thereby, thickness reduction of the operation display panel-incorporated article can be achieved.

Embodiment 3

Figure 5:
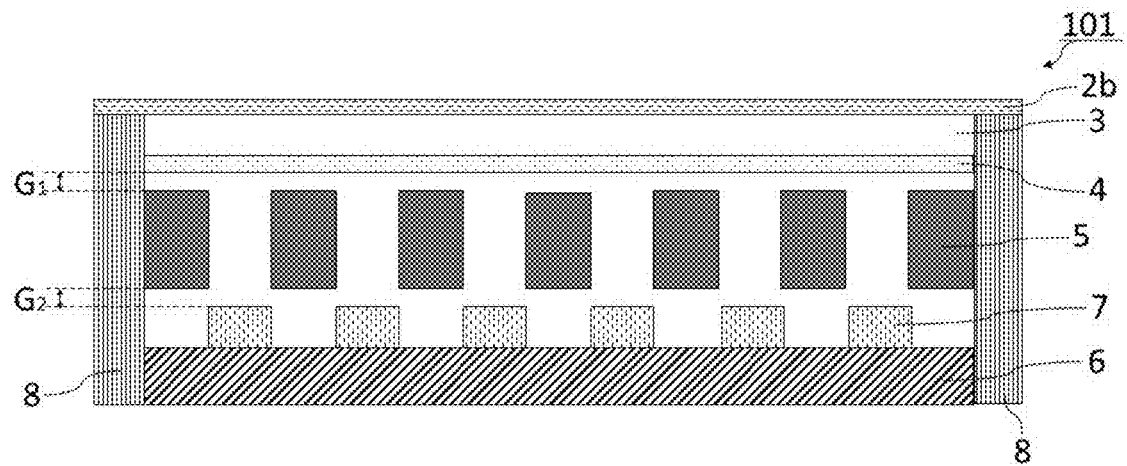
FIG. 5 shows a schematic cross-sectional view of the operation display panel-incorporated article of an Embodiment 3.

FIG. 5 shows a schematic cross-sectional view of the operation display panel-incorporated article of Embodiment 3.

As shown in FIG. 5, in the operation display panel-incorporated article 101, unlike Embodiment 1, a cloth material 2b is used instead of the wood veneer 2.

By using the cloth material 2b, for example, the appearance and texture similar to the wallpaper of a room can be obtained, and an operation display panel-incorporated article in which the user does not easily feel stress can be achieved.

Embodiment 4

Figure 6:
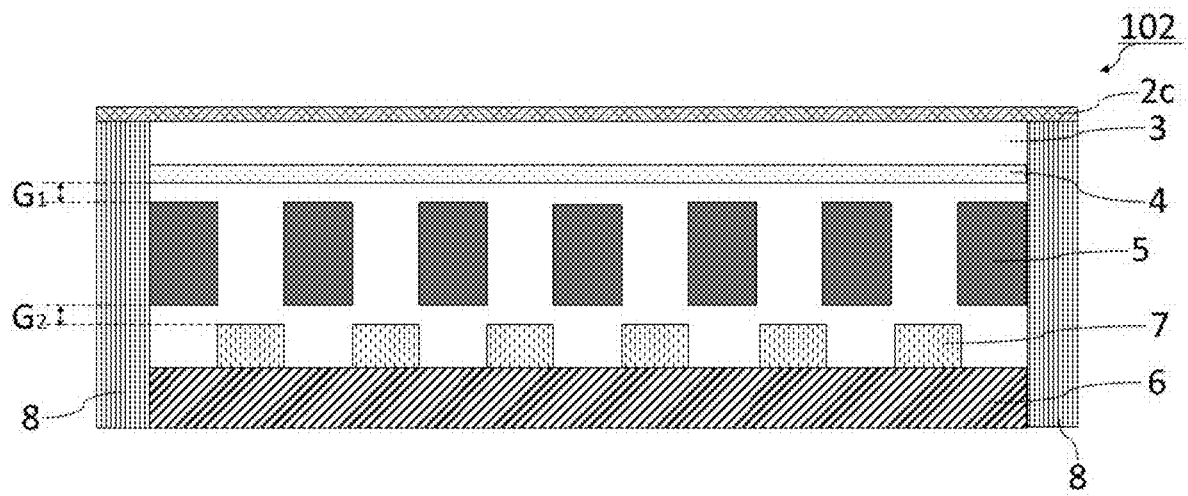
FIG. 6 shows a schematic cross-sectional view of the operation display panel-incorporated article of an Embodiment 4.

FIG. 6 shows a schematic cross-sectional view of the operation display panel-incorporated article of Embodiment 4.

As shown in FIG. 6, in the operation display panel-incorporated article 102, unlike Embodiment 1, a stone 2c is used instead of the wood veneer 2.

By using a stone veneer 2c, the operation display panel-incorporated article can be set as an operation display panel incorporating article with high quality interior characteristics.

Embodiment 5

Figure 7:
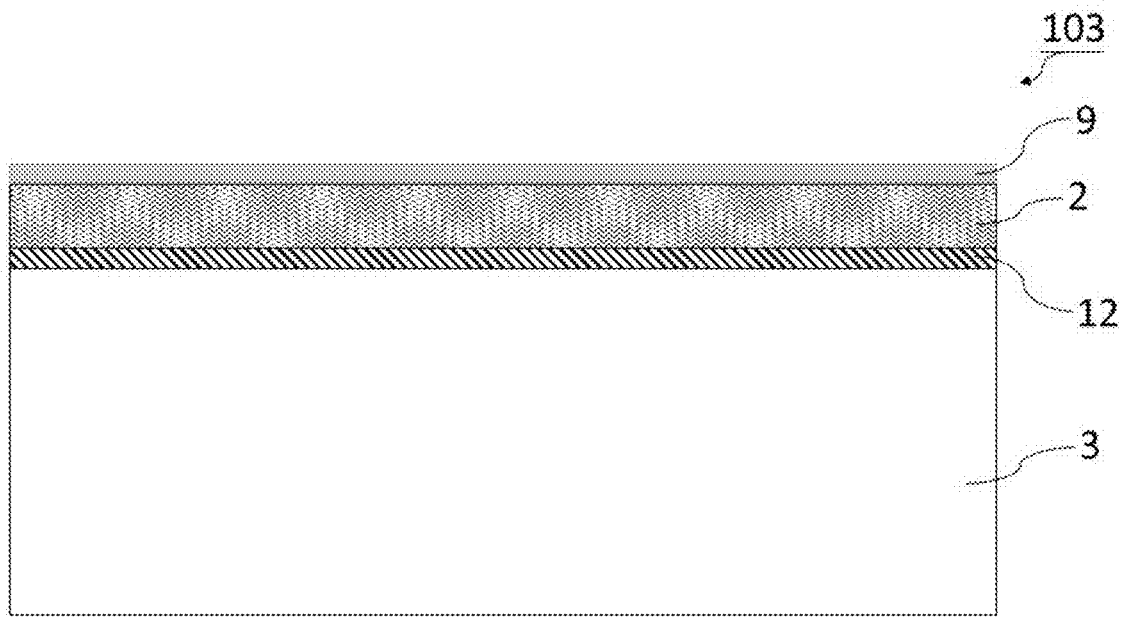
FIG. 7 shows an adhesion image diagram of a wood veneer and a transparent base material of an Embodiment 5.

FIG. 7 shows an adhesion image diagram of the wood veneer and the transparent base material of Embodiment 5. As shown in FIG. 7, the veneer (or plate) 2 and the transparent base 3 constituting the operation display panel-incorporated article 103 are adhered by an adhesive 12. Urethane coating is applied to the surface of the plate 2 to form a urethane layer 9, which prevents generation of scratches and adhesion of dirt.

Embodiment 6

Figure 8:
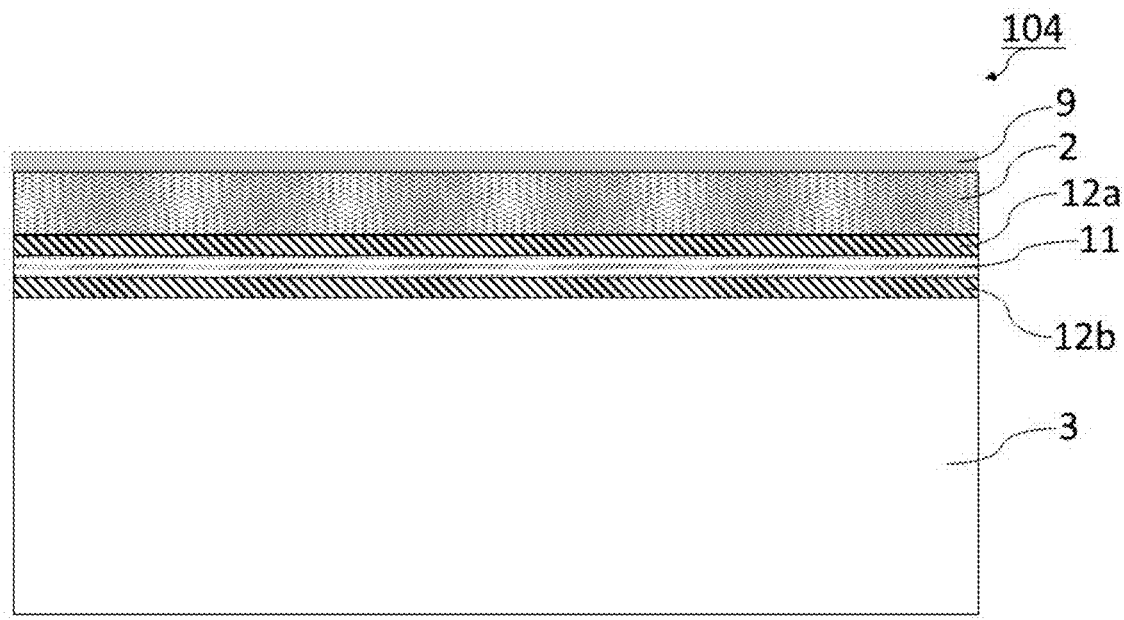
FIG. 8 shows an adhesion image diagram of the wood veneer and the transparent substrate of an Embodiment 6.

FIG. 8 shows an adhesion image diagram of the veneer and the transparent substrate of Embodiment 6. As shown in FIG. 8, the surface of the veneer 2 constituting the operation display panel built-in article 104 is covered by urethane layer 9 formed by a urethane coating to prevent generation of scratches and adhesion of dirt.

However, unlike Embodiment 5, a polyvinyl chloride film 11 is attached to the back surface of the veneer 2 as a backing material using an adhesive 12a. This is provided to reinforce the veneer 2. Since the polyvinyl chloride film 11 is a material with high transparency, it is possible to effectively reinforce the plate 2 with almost no influence on the transmittance.

Furthermore, the veneer 2 and the transparent substrate 3 pasted with polyvinyl chloride film 11 are adhered by an adhesive 12b.

Embodiment 7

Figure 9:
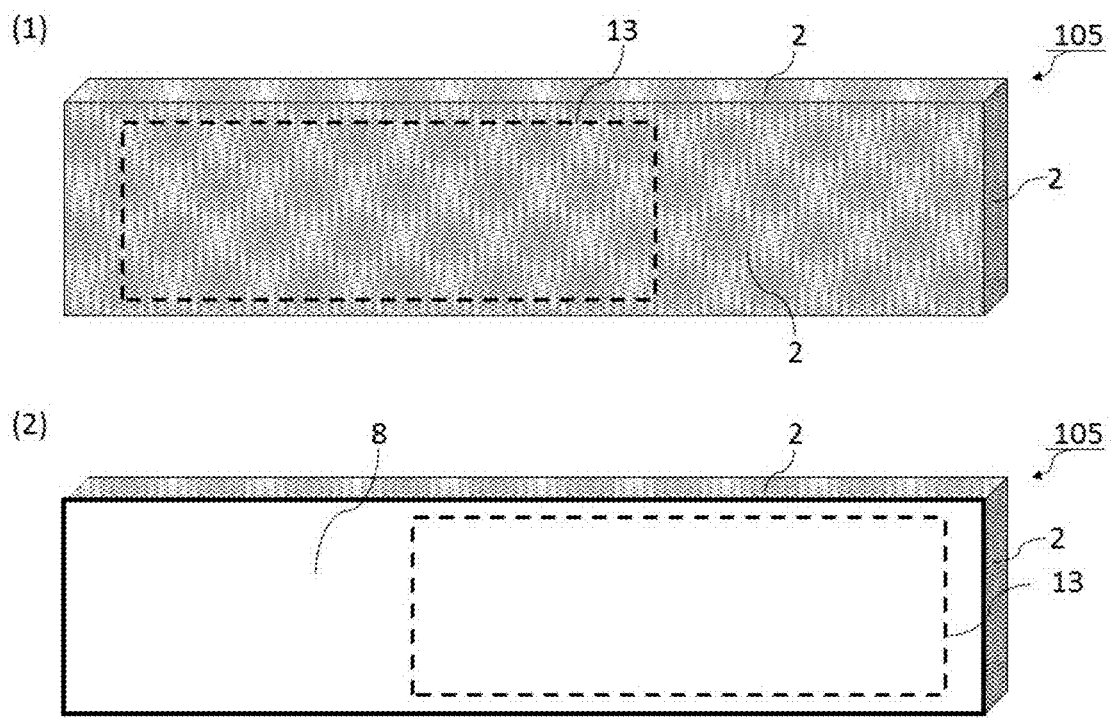
FIG. 9 is a perspective view of the operation display panel-incorporated article of an Embodiment 7.

FIG. 9 is a perspective view of the operation display panel-incorporated article of Embodiment 7, (1) showing a perspective view from the front, and (2) showing a perspective view from the back.

As shown in FIG. 9 (1), the operation display panel-incorporated article 105 is covered with the wood veneer 2 in a front view, and thus has a shape as if it were a single wooden board. An operation display panel unit 13 is disposed inside the operation display panel-incorporated article 105. Here, the operation display panel unit 13 refers to the one including the wood veneer 2, transparent base 3, the touch panel sheet 4, the light guide 5 and the LED array 6 shown in FIG. 2, with the wood veneer being eliminated therefrom. Note that the LED array 6 is provided with a large number of LED light sources, 7 similar to Embodiment 1.

As shown in FIG. 9 (2), the wood veneer 2 is not attached to the back surface of the operation display panel-incorporated article 105, and the housing 8 is exposed.

Figure 10:
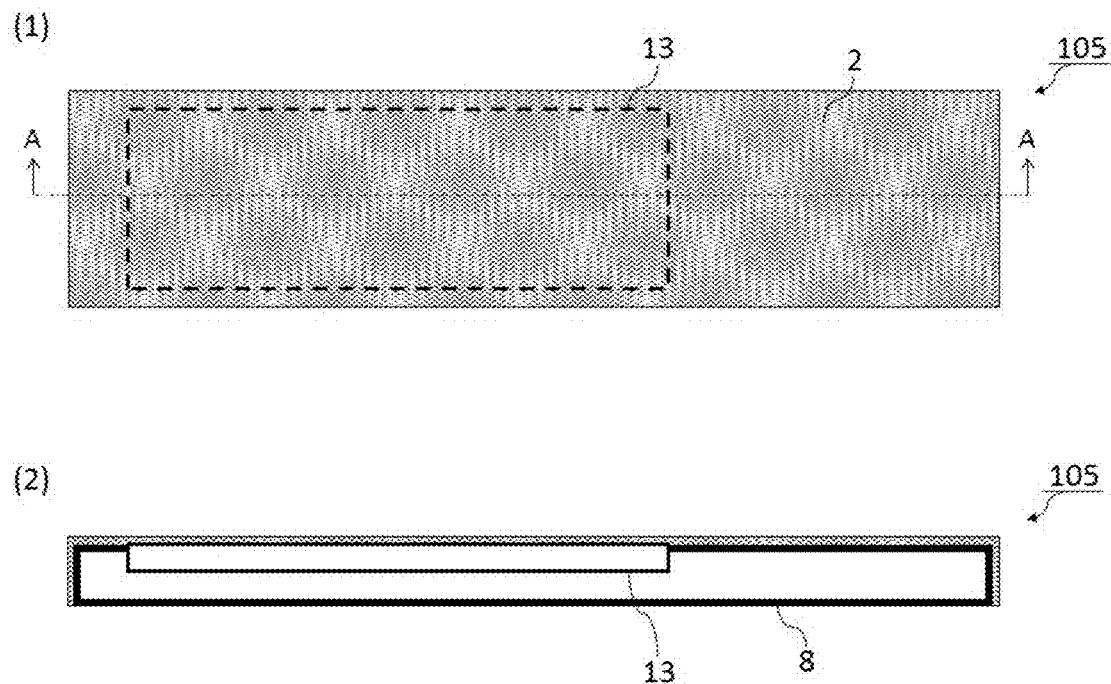
FIG. 10 is an explanatory view of the operation display panel-incorporated article of the Embodiment 7.

FIG. 10 is an explanatory view of the operation display panel-incorporated article of Embodiment 7, (1) showing a front view, and (2) showing an A-A sectional view. As shown in FIG. 10 (1), the operation display panel unit 13 is disposed inside the operation display panel-incorporated article 105. As shown in FIG. 10 (2), the housing 8 is not in the shape of a rectangular parallelepiped, and the portion where the operation display panel unit 13 is disposed is in an open state. Although not shown, a touch control IC, a main microcomputer, a wireless communication device, a power supply, and the like are provided inside the housing 8.

Embodiment 8

Figure 11:
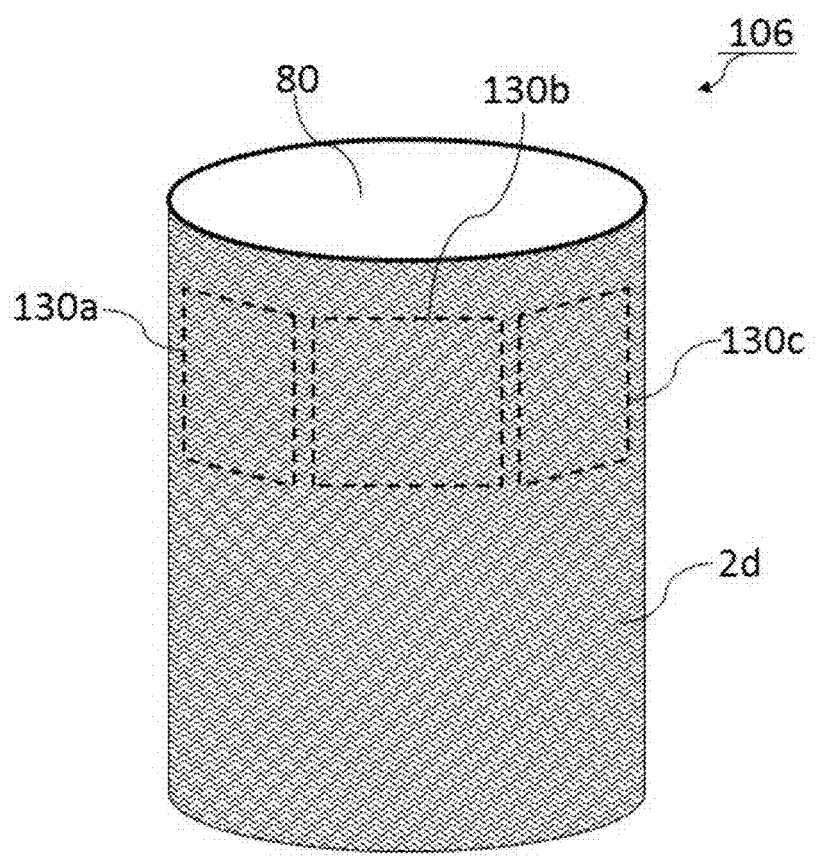
FIG. 11 shows a perspective view of the operation display panel-incorporated article of an Embodiment 8.

FIG. 11 shows a perspective view of the operation display panel-incorporated article of Embodiment 8. As shown in FIG. 11, the operation display panel-incorporated article 106 has a cylindrical shape. The plate 2d is formed of a flexible material, and is stuck on an outer peripheral side surface of the housing 80 in a curved state. In addition, the transparent base material and touch panel sheet which are not illustrated here are mentioned later.

The housing 80 also has a substantially cylindrical shape, but the portion where the operation display panel units (130a to 130c) are disposed has an open shape.

Figure 12:
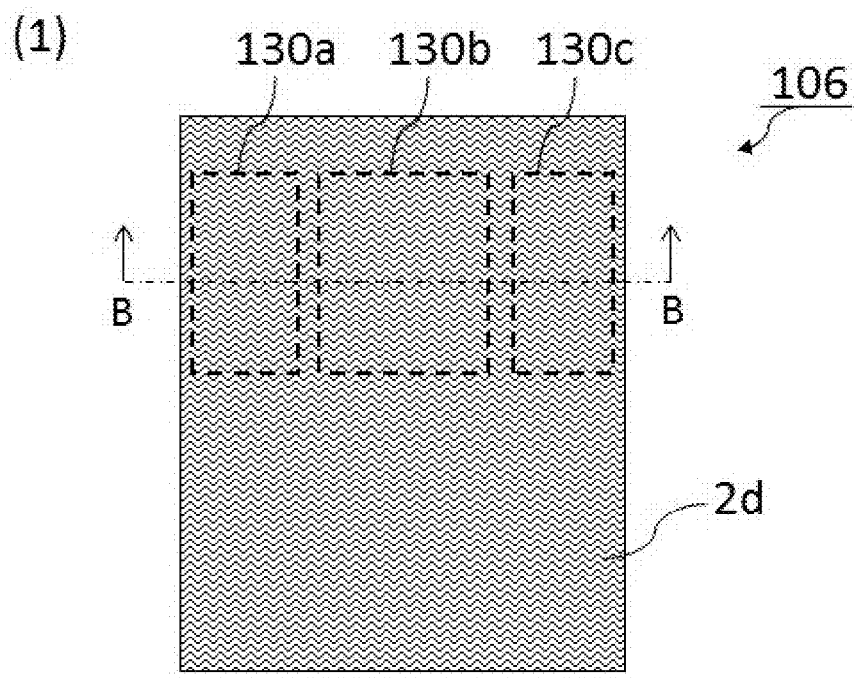
FIG. 12 is an explanatory diagram of an operation display panel-incorporated article of the Embodiment 8.
Figure 12:
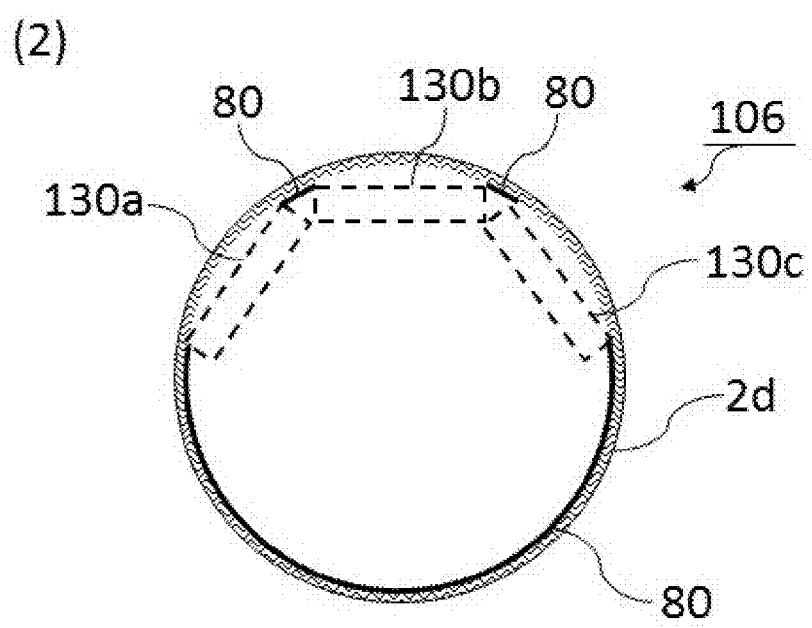

FIG. 12 is an explanatory diagram of an operation display panel-incorporated article of Embodiment 8, (1) showing a front view, and (2) showing a B-B sectional view. As shown in FIG. 12 (1), operation display panel units (130a to 130c) are disposed inside the operation display panel-incorporated article 106.

As shown in FIG. 12 (2), the operation display panel units (130a to 130c) are arranged to emit light in the direction of the outer peripheral surface from the axial center of the cylindrical operation display panel-incorporated article 106.

Next, by referring to FIG. 13, the relationship among the operation display panel units (130a to 130c), the plate 2d, the transparent base 3d, the touch panel sheet 4d, and the housing 80 in the operation display panel-incorporated article 106 will be explained.

Figure 13:
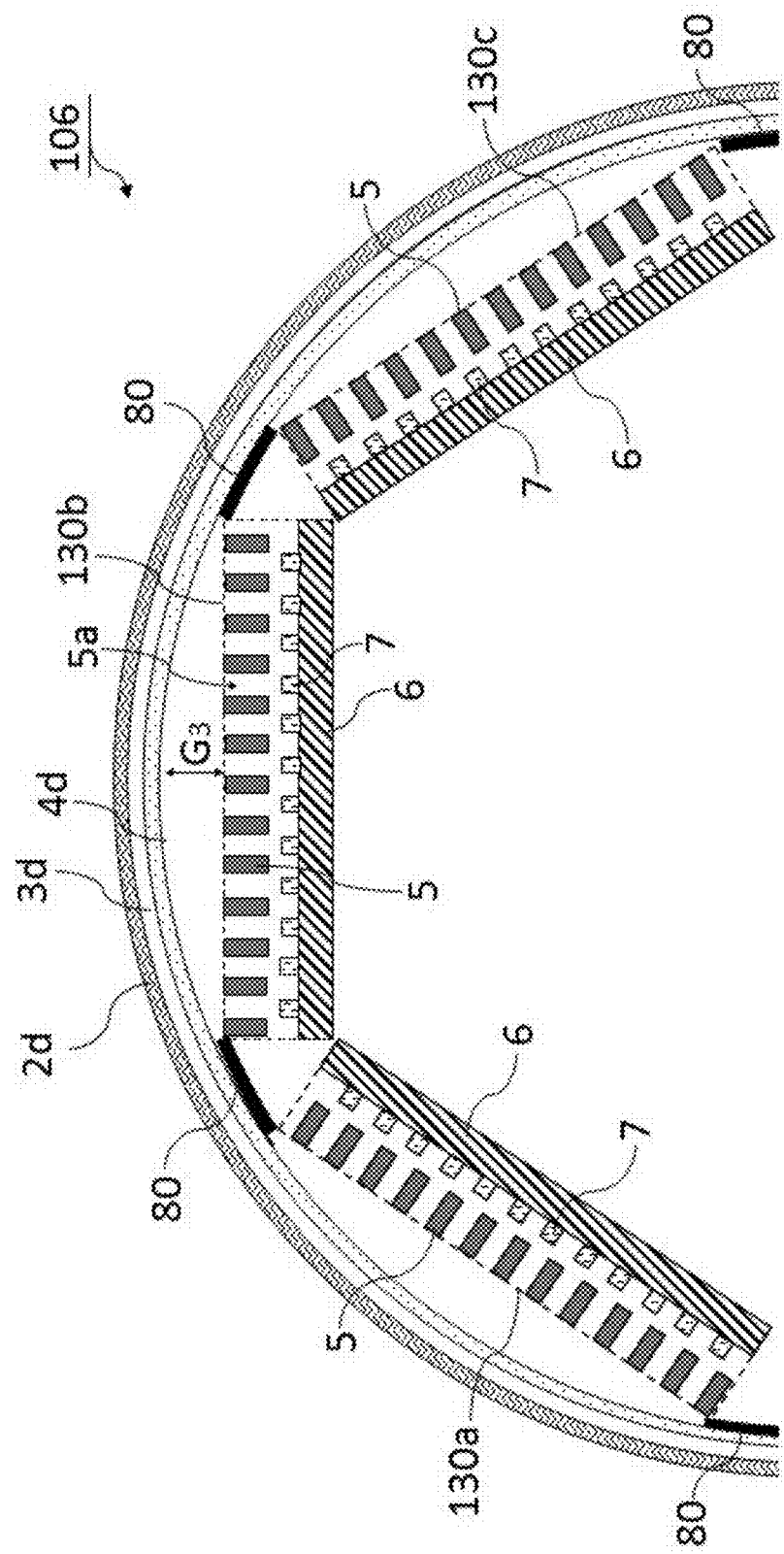
FIG. 13 shows an enlarged explanatory view of the operation display panel-incorporated article of the Embodiment 8.

FIG. 13 shows an enlarged explanatory view of the operation display panel-incorporated article of Embodiment 8. As shown in FIG. 13, the operation display panel unit (130a to 130c) is composed of the light guide 5 and the LED array 6, and the LED array 6 is provided with a large number of LED light sources 7 as in Embodiment 1. While all the operation display panel units (130a to 130c) have a flat board shape, the veneer 2d, the transparent base 3d, and the touch panel sheet 4d have a substantially cylindrical shape conforming to the outer peripheral surface of the housing 80 and stuck together in order. Therefore, a gap $G_3$ is provided between the veneer 2d, the transparent base 3d, the touch panel sheet 4d and the operation display panel units (130a to 130c). Further, the gap between the operation display panel unit 130a and the operation display panel unit 130b, or between the operation display panel unit 130b and the operation display panel unit 130c is to be comprised of a housing 80.

In the present embodiment, it is configured that sufficient visibility and operability can be obtained even if the gap $G_3$ and the casing 80 portion between the operation display panel units (130a to 130c) are provided. However, by making the size of the operation display panel units (130a-130c) smaller and by mounting more operation display panel units, the range of the gap $G_3$ can be narrowed, or the casing 80 portion between panel units (130a-130c) can be reduced.

Further, in the present Embodiment, the operation display panel units (130a to 130c) are provided only at about a half circumference of the cylindrical shape, but display may be provided on the entire outer peripheral surface so as to cover the entire outer peripheral surface of the operation display panel-incorporated article 106.

As described above, by forming the cylindrical operation display panel-incorporated article, it is possible to obtain an article with high quality interior goods. In addition, the operation display panel-incorporated article 106 is not only high in the interior characteristics due to using natural materials but also gives a good touch by using the curved-plate shaped wood veneer 2d, and its texture can be enjoyed at each operation and presents a high quality experience to the user.

Embodiment 9

Figure 15:
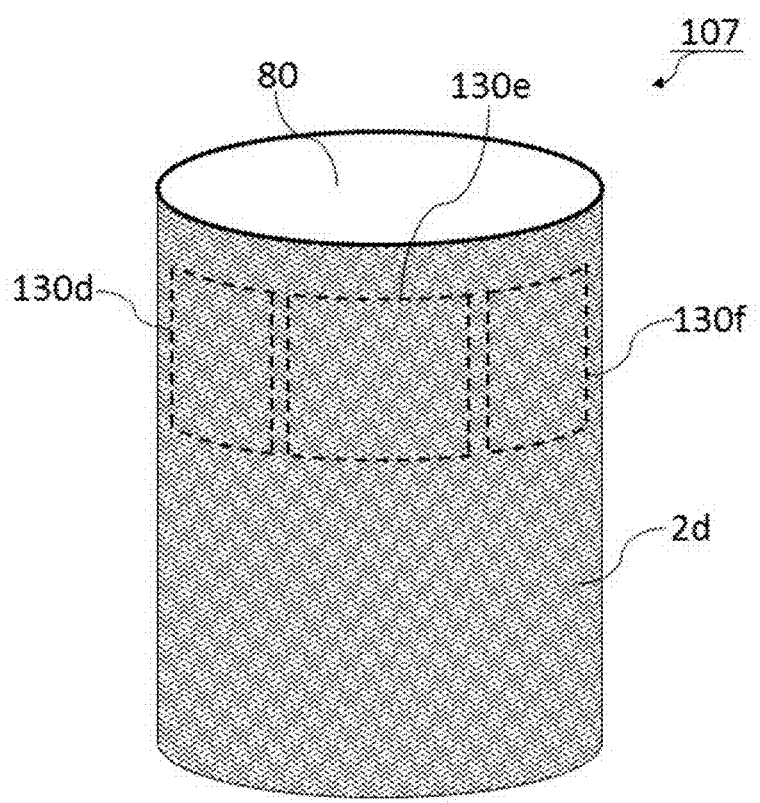
FIG. 15 shows a perspective view of the operation display panel-incorporated article of an Embodiment 9.

FIG. 15 shows a perspective view of the operation display panel-incorporated article of Embodiment 9. As shown in FIG. 15, the outer shape of the operation display panel-incorporated article 107 has a cylindrical shape, like the operation display panel-incorporated article 106 of Embodiment 8. The plate 2d is formed of a flexible material, and is stuck on the outer peripheral side surface of the housing 80 in a curved state. In addition, the transparent base material and touch panel sheet which are not illustrated here are mentioned later.

The housing 80 also has a substantially cylindrical shape, but the portion where the operation display panel units (130d-130f) are disposed has an opening shape.

Figure 16:
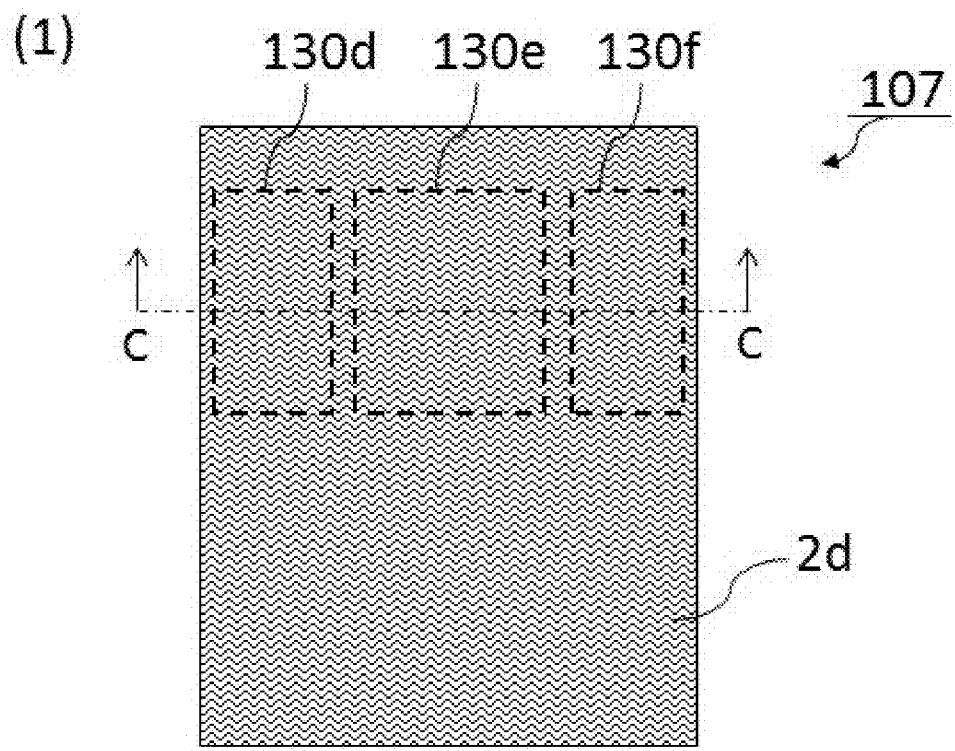
FIG. 16 is an explanatory diagram of an operation display panel-incorporated article of Embodiment 9.
Figure 16:
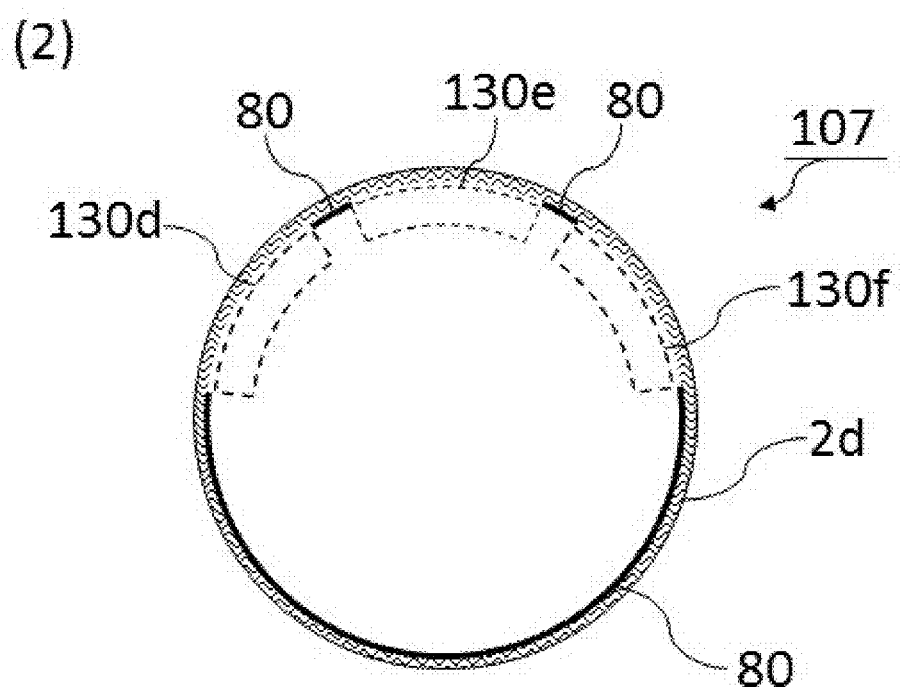

FIG. 16 is an explanatory diagram of an operation display panel-incorporated article of Embodiment 9, (1) showing a front view, (2) showing a C-C sectional view indicated in (1). As shown in FIG. 16 (1), operation display panel units (130d to 130f) are disposed inside the operation display panel-incorporated article 107.

As shown in FIG. 16 (2), the operation display panel units (130d-130f) are arranged to emit light in the direction of the outer peripheral surface from the axial center of the cylindrical operation display panel-incorporated article 107.

Figure 17:
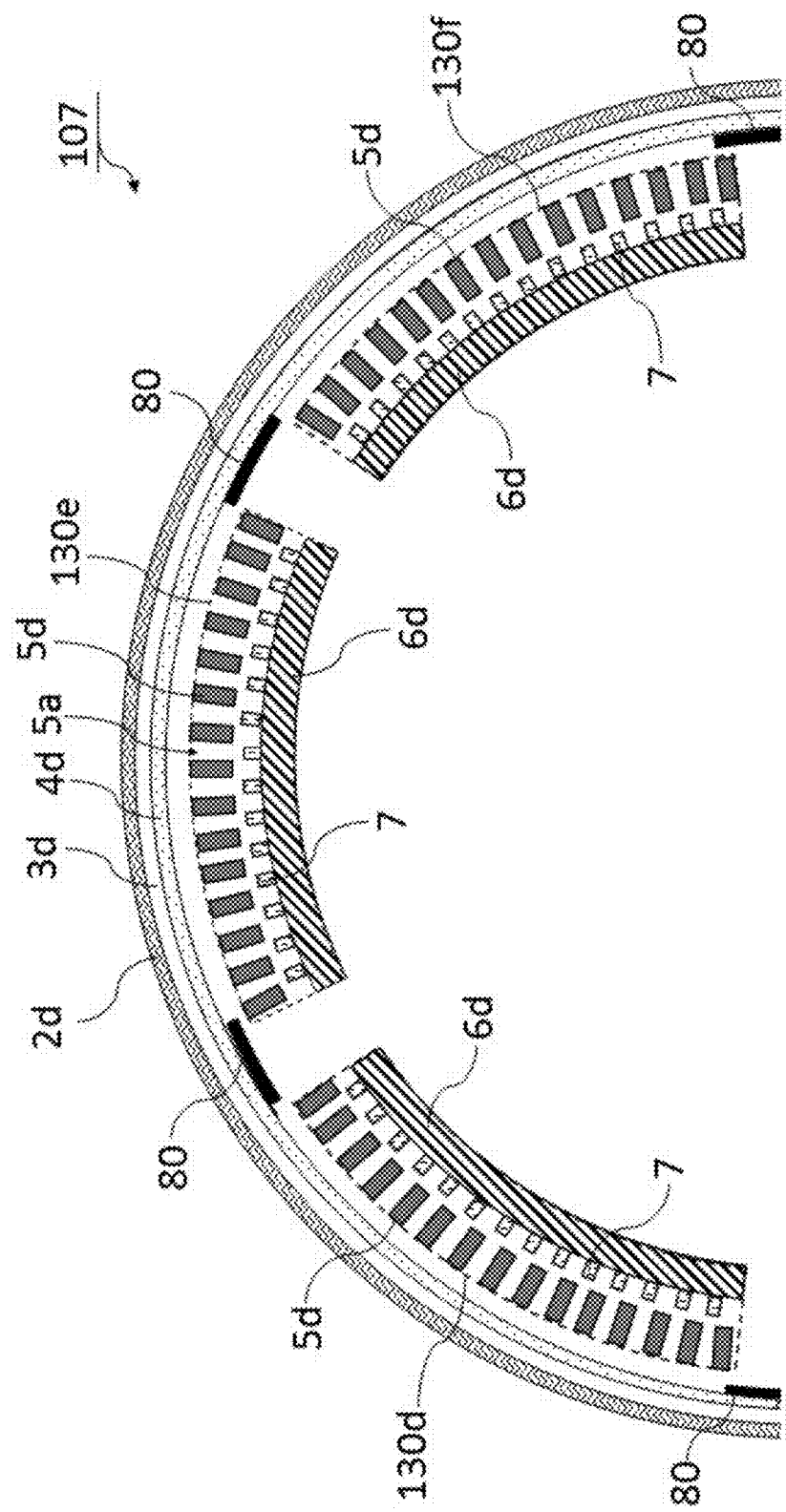
FIG. 17 shows an enlarged explanatory view of the operation display panel-incorporated article of Embodiment 9.

Next, by referring to FIG. 17, the relationships among the operation display panel units (130d to 130f) and the plate 2d, the transparent base 3d, the touch panel sheet 4d, and the housing 80 in the operation display panel-incorporated article are explained.

FIG. 17 shows an enlarged explanatory view of the operation display panel-incorporated article of Embodiment 9. As shown in FIG. 17, the operation display panel unit (130d-130f) comprises a light guide 5d and an LED array 6d, and the LED array 6d is provided with a large number of LED light sources 7 as in Embodiment 1. While all the operation display panel units (130a-130c) in Embodiment 8 have a flat board shape, in the operation display panel units (130d-130f), both the light guide 5d and the LED array 6d being used are flexible, and unlike Embodiment 8, the operation display panel unit (130d to 130f) has a curved shape that is matched to the outer peripheral surface shape of the casing 80, having a substantially cylindrical shape, and the shape of the plate 2d, the transparent base 3d, the touch panel sheet 4d, as thus disposed. In accordance with the shape of the sheet 4d, it has a curved shape and is thus disposed. Therefore, the configuration has high visibility and operability at the time of display.

In addition, although the space between the operation display panel unit 130d and the operation display panel unit 130e, or the operation display panel unit 130e and the operation display panel unit 130f is configured by the housing 80, the portion of the housing 80 among operation panel units (130d-130f) may be configured to be reduced as long as enough strength of the housing 80 can be obtained. By this, display range can be expanded and operability can be improved.

Further, in the present embodiment, operation display units (130d-130f) are provided only in approximately half of the cylindrical shape, but one may let the operation display unit cover the entire outer peripheral surface of the panel-incorporated article 107, so that the display can be made on the entire side surface.

Thus, by making the configuration of the operation display panel units (130d to 130f) flexible, it is possible to obtain an operation display panel-incorporated article with high visibility and operability.

Embodiment 10

Figure 18:
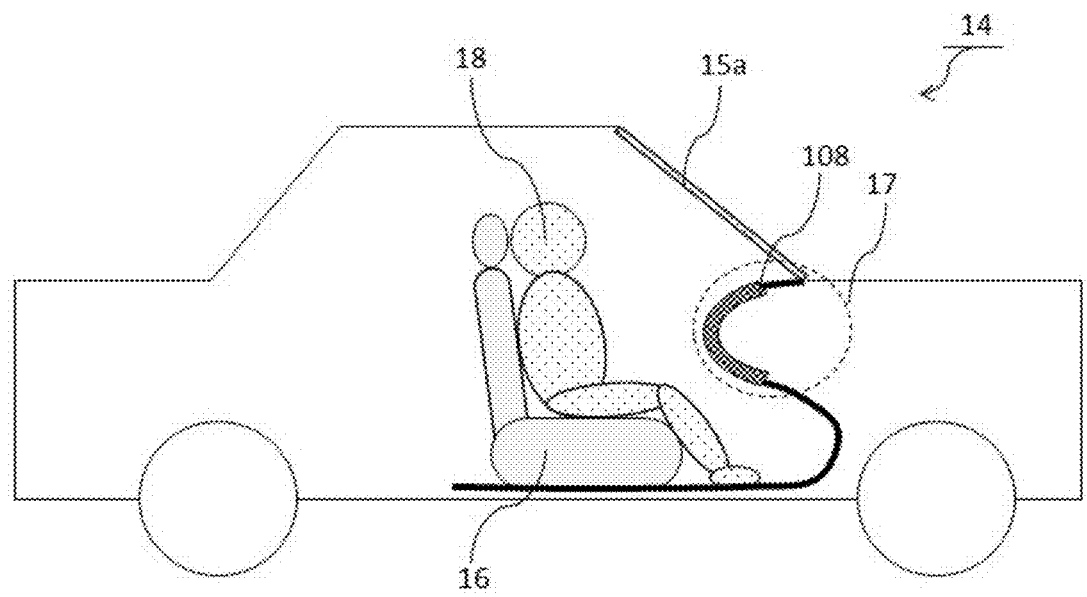
FIG. 18 shows a schematic image view of the operation display panel-incorporated article of an Embodiment 10.

FIG. 18 shows a schematic image view of an operation display panel-incorporated article of Embodiment 10. As shown in FIG. 18, the automobile 14 is provided with a windshield 15a, a seat 16, and an instrument panel 17, and a driver 18 sits on the seat 16. In addition, as a part of the instrument panel 17, an operation display panel-incorporated article 108 is provided.

Unlike this configuration, the headrest of the seat 16 seen from the rear seat (not shown), the back of the seat 16 and the ceiling of the automobile 14 may be used as the operation display panel-incorporated article. In addition, a component where a panel for controlling air conditioning and lighting is provided may be used as the operation display panel-incorporated article.

Figure 19:
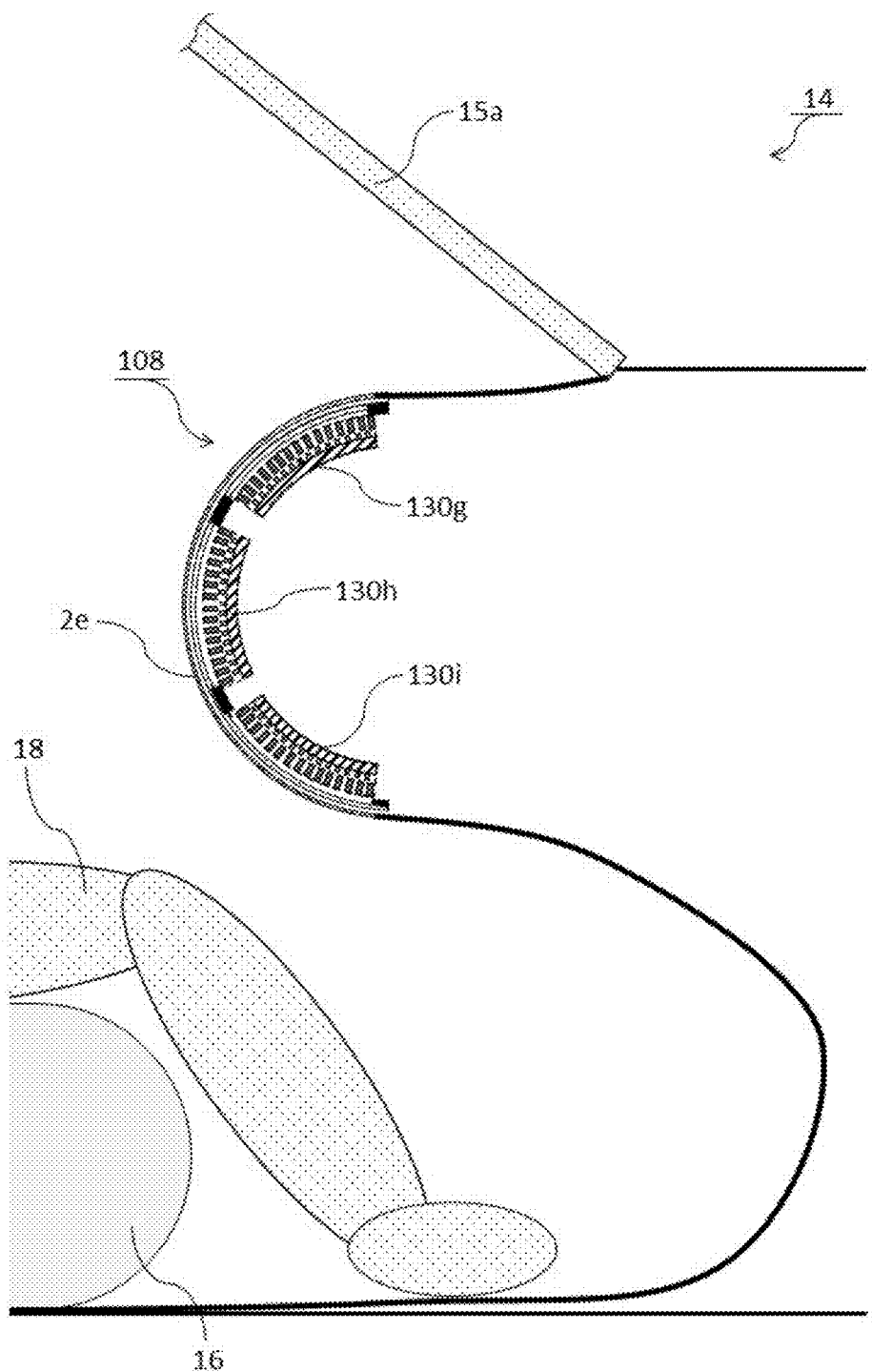
FIG. 19 shows an enlarged explanatory view of the operation display panel-incorporated article of Embodiment 10.

FIG. 19 shows an enlarged explanatory view of the operation display panel-incorporated article of Embodiment 10. As shown in FIG. 19, on the surface of the operation display panel-incorporated article 108, a resin 2e produced so as to mimic the appearance and touch of wood derived from nature is used. Since the resin 2e has a curved surface shape in accordance with the shape of the instrument panel 17, a flexible material is used for the operation display panel units (130g to 130i) as in Embodiment 9.

Although not shown in detail here, the operation display panel-incorporated article 108 is not used at a location where a constant display is required, such as a speedometer or a tachometer, but is configured to be used only for a place where constant display is not necessary. Other places, such as a clock or watch, do not use it.

Embodiment 11

Figure 20:
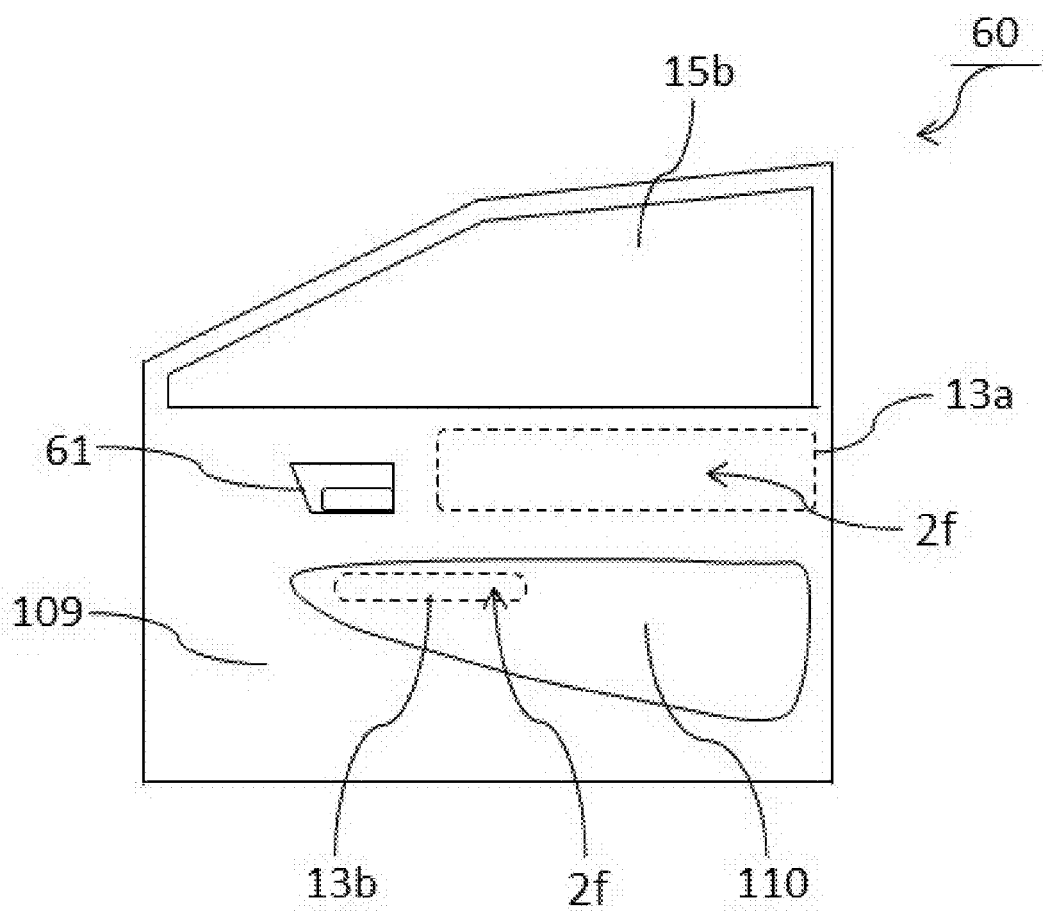
FIG. 20 shows a schematic image view of the operation display panel-incorporated article of an Embodiment 11.

FIG. 20 shows a schematic image view of the operation display panel-incorporated article of Embodiment 11. As shown in FIG. 20, a car door 60 is a door on the right side of a front seat of a car in general. The car door 60 is provided with a side glass 15b, a door inner handle 61, an operation display panel-incorporated article 109 which is a door trim, and an operation display panel-incorporated article 110 which is a door armrest.

The operation display panel-incorporated article 109 is provided with the operation display panel unit 13a, and the surface is covered with a thin layer made of a resin 2f. Since the operation display panel unit 13a is disposed between the side glass 15b and the operation display panel-incorporated article 110 which is a door armrest, the display does not impede the other functions and when the display is not performed, it does not become a visual nuisance because the panel constitutes a part of the look of a usual door trim.

The operation display panel-incorporated article 110 is furnished with the operation display panel unit 13b, and the surface is covered with a thin layer made of a resin 2f. The operation display panel unit 13b is generally disposed at a position where a power window switch is provided, and by touching the operation display panel unit 13b, the side glass 15b can be opened and closed.

When the operation display panel-incorporated article (109, 110) is used, a means for preventing an accident by erroneous operation may be disposed on the inside or the outside of the operation display panel-incorporated article (109, 110).

Although the thin layer provided in the operation display panel-incorporated article 109 and the thin layer provided in the operation display panel-incorporated article 110 are both made of the resin 2f, different resins may be used.

OTHER EMBODIMENTS

As shown in Embodiment 9, by making the operation display panel unit flexible, it becomes possible to incorporate the operation display panel unit into articles of various shapes. Therefore, for example, a chair, a desk, a table, a sofa, a bed, a rack, a shelf, a curtain, a knick-knack or the like used on a daily basis may be used as the operation display panel-incorporated article.

INDUSTRIAL APPLICABILITY

The present invention is useful as a controller of a home appliance, a display of an electronic device, or an operation display device mounted on a movable body such as a car.

DESCRIPTION OF SYMBOLS

1, 1a-1c, 100-110 Operation display panel-incorporated article
2, 2a, 2d Plate
2b Cloth material
2c Stone
2e, 2f Resin
3, 3d Transparent base
4, 4d Touch panel sheet
5, 5d Light guide
5a Guide hole
6, 6d LED array
7 LED light source
8, 80 Casing
9 Urethane layer
9a-9c Light
10 Touch panel unit
11 Polyvinyl chloride film
12, 12a, 12b Adhesive
13, 13a, 13b, 130a-130i Operation display panel unit
14 Automobile
15a Windshield
15b Side glass
16 Seat
17 Instrument panel
18 Driver
20 Control unit
21 Touch panel operation detection unit
22 Touch operation data determination unit
23 Display data
24 Data processing unit
25 LED drive output unit
26 Data transmission/reception unit
27 Data transmission unit
28 Data reception unit
30 Display panel unit
40 External device
50 Communication means
51 Internet
52 Computer
53 Server
60 Car door
61 Door inner handle
G Gap

What is claimed is:

1. A device comprising:
a touch sensor-equipped display panel having a housing, the housing having an outer surface, at least a portion of the outer surface of the housing having a non-planar curved shape, the display panel abutting the non-planar curved shape;
a thin layer of wood of natural origin, natural fiber, natural leather, natural stone, or a material which mimics at least one of the foregoing as to appearance and touch, the thin layer disposed on an outer surface of the housing;
a light emitting element array comprising light emitting elements, the light emitting element array being part of the touch sensor-equipped display panel; and
a light guide configured to guide light in a light emitting direction of the light emitting elements, the light guide having through holes and being part of the touch sensor-equipped display panel, wherein the light emitting elements of the light emitting element array and the through holes of the light guide have the same pattern and they both are arranged at the same pitch, and the pitch interval is 5 mm or less;
wherein the device is configured to make a character or pattern visible on the thin layer, the character or pattern formed of multiple dots, each dot realized by a point light source of a corresponding one of the light emitting elements, individual point light sources being turned on or turned off to express the character or pattern; and
wherein the panel comprises a transparent substrate and a transparent conductive sheet, and wherein the transparent substrate and the transparent conductive sheet are in contact, and wherein a gap is provided between the transparent conductive sheet and the light guide;
wherein:
the transparent substrate, the transparent conductive sheet, the light guide and the light emitting element array are sequentially laminated, or
the transparent conductive sheet, the transparent substrate, the light guide and the light emitting element array are sequentially laminated.

2. The device of claim 1, wherein the thin layer comprises resin and exhibits the non-planar curved shape.

3. The device of claim 2, wherein the resin is flexible.

4. The device of claim 1, wherein the thin layer comprises at least one of: a wood veneer, plywood, or molded wood chips.

5. The device of claim 1, wherein the thin layer comprises a woven or non-woven substrate of natural fibers.

6. The device of claim 1, wherein the light guide is flexible, and the light emitting element array has a flexible substrate.

7. The device of claim 1, wherein the device is incorporated within at least one of the following: an instrument panel in a vehicle, a door trim in a vehicle, or an armrest in a vehicle.

* * * * *